C. O. ROBINET.
TRACTOR NON-SKID MEMBER AND LUG.
APPLICATION FILED DEC. 30, 1918.
1,304,375.
Patented May 20, 1919.
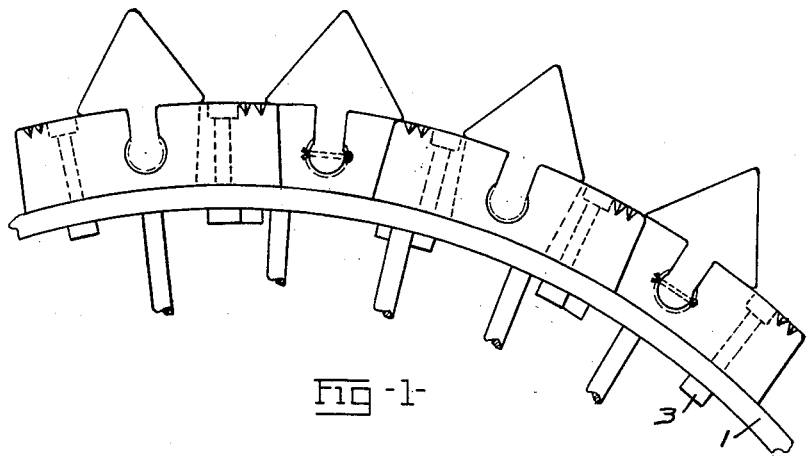
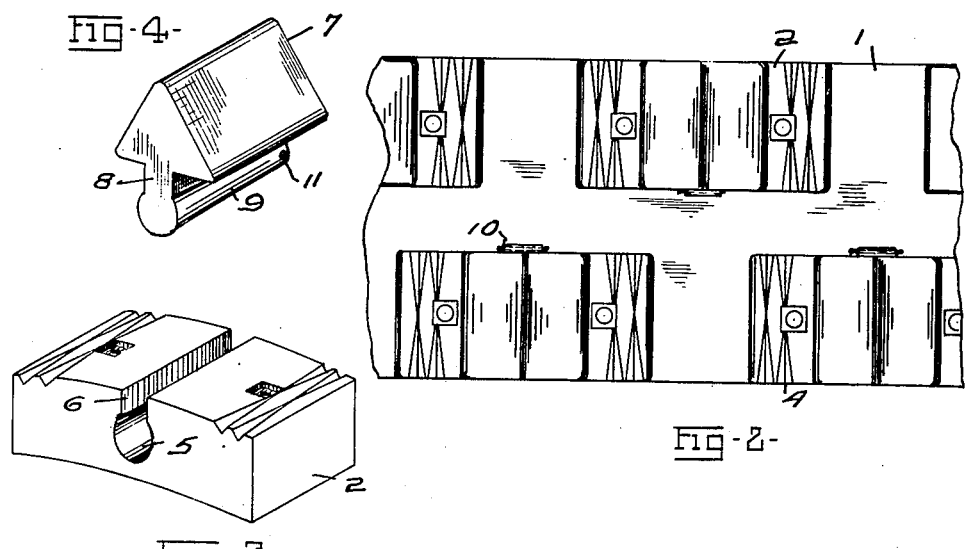
INVENTOR
Clarence O. Robinet
by
Owen, Crane & Crampton

UNITED STATES PATENT OFFICE.

CLARENCE O. ROBINET, OF TOLEDO, OHIO.

TRACTOR NON-SKID TREAD MEMBER AND LUG.

1,304,375.  Specification of Letters Patent.  Patented May 20, 1919.

Application filed December 30, 1918. Serial No. 268,893.

*To all whom it may concern:*

Be it known that I, CLARENCE O. ROBINET, a citizen of the United States, and a resident of Toledo, in the county of Lucas and State of Ohio, have invented a certain new and useful Tractor Non-Skid Tread Member and Lug; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a means in connection with tractor wheels whereby the tractor wheels may be used, not only on roadways for hauling grain, etc., but may also be used in fields for hauling or propelling farm implements. The invention particularly has for its object to provide tread members of tractor wheels with non-skid portions for preventing skidding of the tractor when used on ordinary roads and also removable members that form tractor lugs to be used for tractor purposes and to prevent slipping and skidding of the tractor wheels when traveling over ground yielding in character.

The invention may be modified by those skilled in the art without departing from the spirit thereof. I have selected a construction containing the invention which is described hereinafter. The construction selected is illustrated in the accompanying drawings.

Figure 1 of the drawings illustrates a part of the rim of a tractor wheel containing my invention. Fig. 2 illustrates a top view of the construction illustrated in Fig. 1. Fig. 3 illustrates a perspective view of the tread member and Fig. 4 illustrates the removable tractor lug.

1, Figs. 1 and 2 is the rim of a tractor wheel, to the periphery of which is bolted a plurality of tread members 2 which are disposed in spaced relation to each other. The tread members 2 are preferably placed in two rows, the tread members of one row being located in staggered relation with respect to the tread members of the other row. The tread members are secured by the bolts 3 to the rim 1 of the wheel.

The tread members are provided with V-shaped recesses 4, that extend from the center of the tread members to the side edges of the tread members. The plane surfaces of the recesses 4 are inclined with respect to the surfaces of the rim 1 so that their depths vary according to their distance from the center line of the tread members, passing over the top surfaces of the tread members.

The tread members are also provided with tapered bores 5 and channels 6 that connect the top of the bores 5 with the top of the tread members. Each tread member of the wheel is provided with a lug 7, having a shank 8 that fits the channel 6, and also a tapered head 9 that fits the tapered bore 5. The lugs 7 may be thus readily connected to the tread members 2, when it is desired to change the tractor from one usable for tractor purposes over ordinary roads, particularly for hauling purposes, to one usable for field purposes. To prevent the lugs from slipping sidewise out of the tread members, they may be locked in the tread members by cotter pins 10, which may be inserted in openings 11 formed in the small ends of the heads 9. In order to change the tractor wheel to one usable over ordinary roads, particularly paved roads, the lugs 7 may be removed by removing the cotter pins and drawing them endwise from the tread members 2. If they become secured by dirt or rust, a blow of a hammer will drive them out of the tread members. The spacing and the staggered arrangement of the tread members provides ample room for locking the lugs in the tread members by means of the cotter pins.

Having thus described my invention, what I claim as new, and desire to secure by Letters Patent, is—

In a tractor wheel, a plurality of tread members located in spaced relation and in two rows, the tread members of one row being located in staggered relation with respect to the tread members of the other row, each of the tread members having a tapered bore extending transversely through the tread members, and a channel also extending transversely through the tread member and connecting the bore with the top of the tread member, wedge shaped tractor lugs having shanks and tapered heads fitting the channels and the bores and extending across the width of the tread members and means for locking the wedge shaped lugs in position in the tread members.

In testimony whereof, I have hereunto signed my name to this specification.

CLARENCE O. ROBINET.